(12) United States Patent
Ishii et al.

(10) Patent No.: US 11,398,049 B2
(45) Date of Patent: Jul. 26, 2022

(54) OBJECT TRACKING DEVICE, OBJECT TRACKING METHOD, AND OBJECT TRACKING PROGRAM

(71) Applicant: Nippon Telegraph and Telephone Corporation, Tokyo (JP)

(72) Inventors: Yoko Ishii, Musashino (JP); Kota Hidaka, Musashino (JP); Yoshihide Tonomura, Musashino (JP); Tetsuro Tokunaga, Musashino (JP); Yuichi Hiroi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 26 days.

(21) Appl. No.: 17/056,891

(22) PCT Filed: May 20, 2019

(86) PCT No.: PCT/JP2019/019922
§ 371 (c)(1),
(2) Date: Nov. 19, 2020

(87) PCT Pub. No.: WO2019/225547
PCT Pub. Date: Nov. 28, 2019

(65) Prior Publication Data
US 2021/0209793 A1 Jul. 8, 2021

(30) Foreign Application Priority Data
May 23, 2018 (JP) .............................. JP2018-098848

(51) Int. Cl.
*G06T 7/73* (2017.01)
*G06T 7/246* (2017.01)

(52) U.S. Cl.
CPC ................ *G06T 7/74* (2017.01); *G06T 7/248* (2017.01); *G06T 2207/10016* (2013.01); *G06T 2207/30196* (2013.01)

(58) Field of Classification Search
None
See application file for complete search history.

(56) References Cited

U.S. PATENT DOCUMENTS

2018/0260613 A1* 9/2018 Gao ........................ G06T 7/292
2019/0191098 A1* 6/2019 Ishii ................... H04N 5/23218

OTHER PUBLICATIONS

Ishii et al., "Kirari! Tracker: Human Detection and Tracking System by Using LiDAR and Deep Learning Engine," NTT Service Evolution Laboratories, Previews of the 2017 Winter Congress of the Japan Society of Image, Information and Media, Dec. 12, 2017, 5 pages (with English Translation).

(Continued)

*Primary Examiner* — Matthew C Bella
*Assistant Examiner* — Brian D Shin
(74) *Attorney, Agent, or Firm* — Fish & Richardson P.C.

(57) ABSTRACT

To identify and track a plurality of objects. An object tracking device 1 includes a frame acquisition unit 31 for acquiring one set of frame data 11 included in moving image data that captures a space where a plurality of objects are present; a distance acquisition unit 32 for acquiring measurement data 12 from measurement of three-dimensional coordinates of points configuring the objects in the space where the objects are present; an object position detection unit 33 for detecting a two-dimensional position of each of the objects from the frame data 11 on the basis of comparison with template data of each of the objects; an object distance detection unit 34 for detecting a plurality of three-dimensional positions of the objects from the measurement data 12; and an associating unit 35 for associating each two-dimensional position from the object position detection (Continued)

unit 33 with the nearest three-dimensional position among the three-dimensional positions from the object distance detection unit 34.

7 Claims, 10 Drawing Sheets

(56) References Cited

OTHER PUBLICATIONS

Ntt.co.jp, [online], "Progress in R & D on Immersive Telepresence Technology "Kirari!"," 2018, retrieved on Sep. 29, 2020, retrieved from URL<https://www.ntt.co.jp/news2018/1802/180219b.html>, 10 pages (with English Translation).

Tokunaga et al., "Construction and Evaluation of Stone Position Detection System in Curling Competition," NTT Service Evolution Laboratories, 2017 Annual Meeting of the Japan Society of Video, Information and Media, Aug. 30, 2017, 5 pages (with English Translation).

\* cited by examiner

| OBJECT IDENTIFIER | TWO-DIMENSIONAL POSITION |
|---|---|
| OBJECT A | (x1, y1)(x2, y2) |
| OBJECT B | (x3, y3)(x4, y4) |

13 TWO-DIMENSIONAL POSITION DATA

Fig. 4

| | 14 THREE-DIMENSIONAL POSITION DATA |
|---|---|
| LABEL | THREE-DIMENSIONAL POSITION |
| OBJECT M | (X1, Y1, Z1)(X2, Y2, Z2) |
| OBJECT N | (X3, Y3, Z3)(X4, Y4, Z4) |

Fig. 5

| OBJECT IDENTIFIER | TWO-DIMENSIONAL POSITION | THREE-DIMENSIONAL POSITION |
|---|---|---|
| OBJECT A | (x1, y1)(x2, y2) | (X1, Y1, Z1)(X2, Y2, Z2) |
| OBJECT B | (x3, y3)(x4, y4) | (X3, Y3, Z3)(X4, Y4, Z4) |

15 ASSOCIATED DATA

Fig. 6

| FRAME | OBJECT IDENTIFIER | TWO-DIMENSIONAL POSITION | THREE-DIMENSIONAL POSITION |
|---|---|---|---|
| F=a-1 | OBJECT A | ... | ... |
|  | OBJECT B | ... | ... |
| F=a | OBJECT A | (x1, y1)(x2, y2) | (X1, Y1, Z1)(X2, Y2, Z2) |
|  | OBJECT B | (x3, y3)(x4, y4) | (X3, Y3, Z3)(X4, Y4, Z4) |

16 TRACKING DATA

OBJECT TRACKING DEVICE, OBJECT TRACKING METHOD, AND OBJECT TRACKING PROGRAM

CROSS-REFERENCE TO RELATED APPLICATIONS

This application is a National Stage application under 35 U.S.C. § 371 of International Application No. PCT/JP2019/019922, having an International Filing Date of May 20, 2019, which claims priority to Japanese Application Serial No. 2018-098848, filed on May 23, 2018. The disclosure of the prior application is considered part of the disclosure of this application, and is incorporated in its entirety into this application.

TECHNICAL FIELD

The present invention relates to an object tracking device, an object tracking method, and an object tracking program for tracking, from moving image data that captures a space where a plurality of objects are present, positions of the objects.

BACKGROUND ART

There is a conventional technology that tracks a position of an object positioned in a predetermined area (see, for example, NPL 1). In NFL 1, the game situation during watching curling is understood by detecting the stone position for each throwing and by providing to audiences' smartphones stone position information when viewed from directly above.

CITATION LIST

Non Patent Literature

[NPL 1] Tetsuro TOKUNAGA, Yoshihide TONOMURA, Jun SHIMAMURA, "Construction and Evaluation of a Stone Position Detection System in Curling Game", ITE Annual Convention 2017, 2017

SUMMARY OF THE INVENTION

Technical Problem

Unfortunately, in the method described in NPL 1, although it is possible to track two-dimensional position of an object such as a stone, it is impossible to identify a plurality of objects and acquire three-dimensional positions of the objects.

Accordingly, a purpose of the present invention is to provide an object tracking device, an object tracking method, and an object tracking program that may identify and track a plurality of objects.

Means for Solving the Problem

To solve the above problem, a first feature of the present invention relates to an object tracking device for tracking, from moving image data that captures a space where a plurality of objects are present, positions of the objects. An object tracking device according to a first feature of the present invention includes a frame acquisition unit for acquiring one set of frame data included in the moving image data that captures the space where the objects are present; a distance acquisition unit for acquiring measurement data from measurement of three-dimensional coordinates of points configuring the objects in the space where the objects are present; an object position detection unit for detecting a two-dimensional position of each of the objects from the frame data on the basis of comparison with template data of each of the objects; an object distance detection unit for detecting a plurality of three-dimensional positions of the objects from the measurement data; and an associating unit for associating each two-dimensional position output from the object position detection unit with the nearest three-dimensional position among the three-dimensional positions output from the object distance detection unit, processes of the distance acquisition unit, the object position detection unit, the object distance detection unit, and the associating unit being repeated for other sets of frame data included in the moving image data.

The object tracking device according may further include: a specific site position detection unit for detecting a two-dimensional position of a specific site of the object from the two-dimensional position of the object; a specific site distance detection unit for detecting a three-dimensional position of the specific site of the object from the three-dimensional position of the object; and a state estimation unit for estimating a state of the object from the two- and three-dimensional positions of the specific site.

If a plurality of three-dimensional positions are present near a predetermined two-dimensional position, the associating unit may identify the three-dimensional position nearest the predetermined two-dimensional position with reference to a process result of a frame other than the process target frame.

A second feature of the present invention relates to an object tracking method of tracking, from moving image data that captures a space where a plurality of objects are present, positions of the objects. The object tracking method according to the second feature of the present invention includes the steps of: acquiring, by a computer, one set of frame data included in the moving image data that captures the space where the objects are present; acquiring, by the computer, measurement data from measurement of three-dimensional coordinates of points configuring the objects in the space where the objects are present; detecting, by the computer, a two-dimensional position of each of the objects from the frame data on the basis of comparison with template data of each of the objects; detecting, by the computer, a plurality of three-dimensional positions of the objects from the measurement data; and associating, the computer, each two-dimensional position output from the step of detecting a two-dimensional position with the nearest three-dimensional position among the three-dimensional positions output from the step of detecting a plurality of three-dimensional positions, the computer repeating each step.

The object tracking method may further include the steps of: detecting, by the computer, a two-dimensional position of a specific site of each object from the two-dimensional position of each object; detecting, by the computer, a three-dimensional position of the specific site of each object from the three-dimensional position of each object; and estimating, by the computer, a state of each object from the two- and three-dimensional positions of the specific site.

If a plurality of three-dimensional positions are present near the predetermined two-dimensional position, the associating step may include identifying the three-dimensional position nearest the predetermined two-dimensional position with reference to the process result of a frame other than the process target frame.

A third feature of the present invention relates to an object tracking program for causing a computer to function as the object tracking device according to the first feature of the present invention.

Effects of the Invention

The present invention may provide an object tracking device, an object tracking method, and an object tracking program that may identify and track a plurality of objects.

DESCRIPTION OF EMBODIMENTS

An embodiment of the present invention will now be described with reference to the drawings. In the following description of the drawings, the same or similar elements are designated with the same or similar reference symbols.

Object Tracking System

Figure 1:
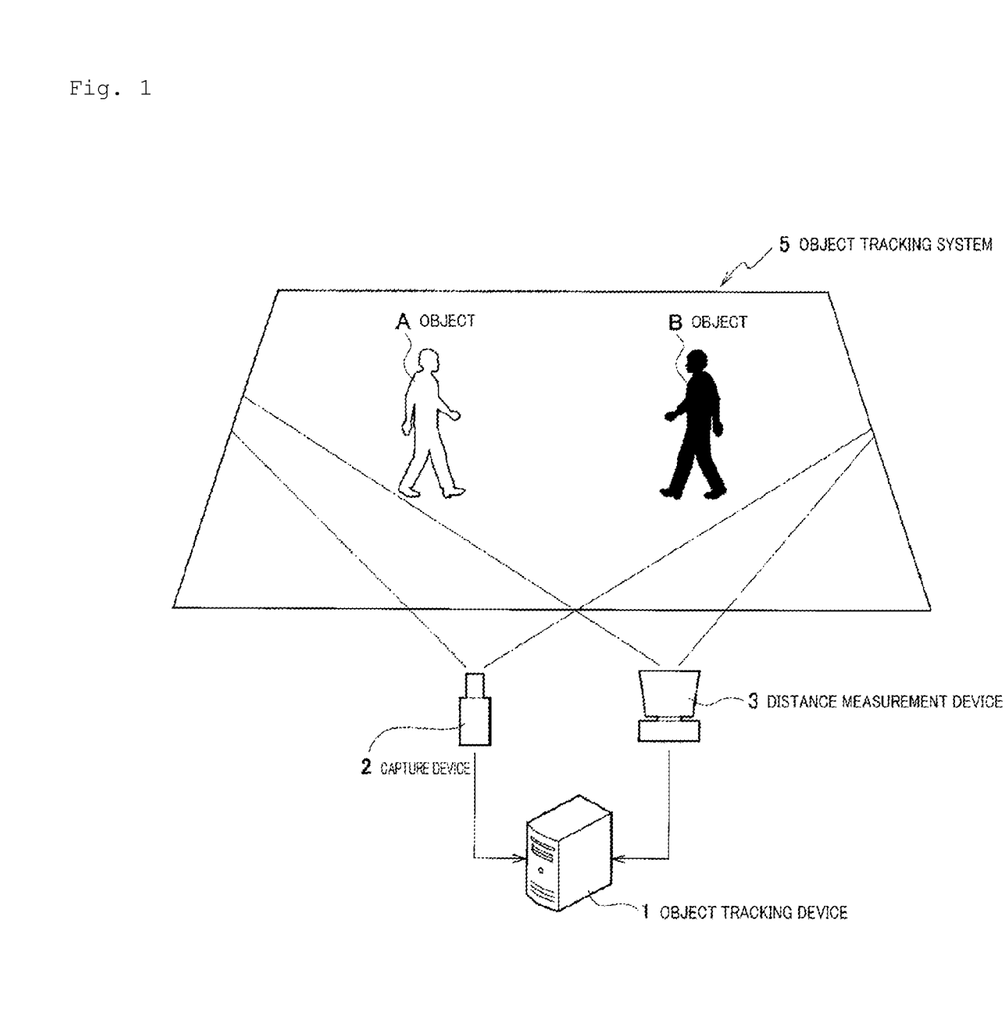
FIG. 1 illustrates a system configuration of an object tracking system according to an embodiment of the present invention.

With reference to FIG. 1, an object tracking system 5 according to an embodiment of the present invention will be described. The object tracking system 5 includes an object tracking device 1, a capture device 2, and a distance measurement device 3. The object tracking system 5 identifies and tracks each of a plurality of objects positioned in a target space such as a stage or game venue.

In the embodiment of the present invention, the object is a person of objects A and B that do Judo sport, but is not limited thereto. The object may be a person who does other actions such as acting. The object may also be a moving body such as an animal or robot or the like or a stationary body such as a stage facility.

The object tracking device 1 is a computer for tracking, from moving image data that captures a space where a plurality of objects are present, positions of the objects. The object tracking device 1 identifies each of the objects and traces the motion of each object.

The capture device 2 is, for example, a camera for use in capturing a moving image. The capture device 2 captures a target space where a plurality of objects are present and outputs moving image data to the object tracking device 1. The moving image data output from the capture device 2 includes plural sets of time-series frame data. Each set of frame data includes color information such as RGB for each pixel. The capture device 2 may have any configuration that may capture a target space where a plurality of objects are present. The capture device 2 may be configured to include one camera or a plurality of cameras. When captured bye a plurality of cameras, frames captured at the same time are combined to generate moving image data, which is processed by the object tracking device 1.

The distance measurement device 3 captures the target space where the objects are present and measures three-dimensional positions of the objects. The distance measurement device 3 is, for example, a light detection and ranging (LiDAR), or stereo camera, which may measure three-dimensional positions. The distance measurement device 3 outputs measurement data of a position of an object in the target space. The position is represented by a point group having position information of three-dimensional coordinates (x, y, z). The distance measurement device 3 may have any configuration that may measure a target space where a plurality of objects are present. The distance measurement device 3 may be configured to include one device or a plurality of devices. When measured by a plurality of devices, measurement results measured at the same time are combined to generate measurement data, which is processed by the object tracking device 1.

Object Tracking Device

Figure 2:
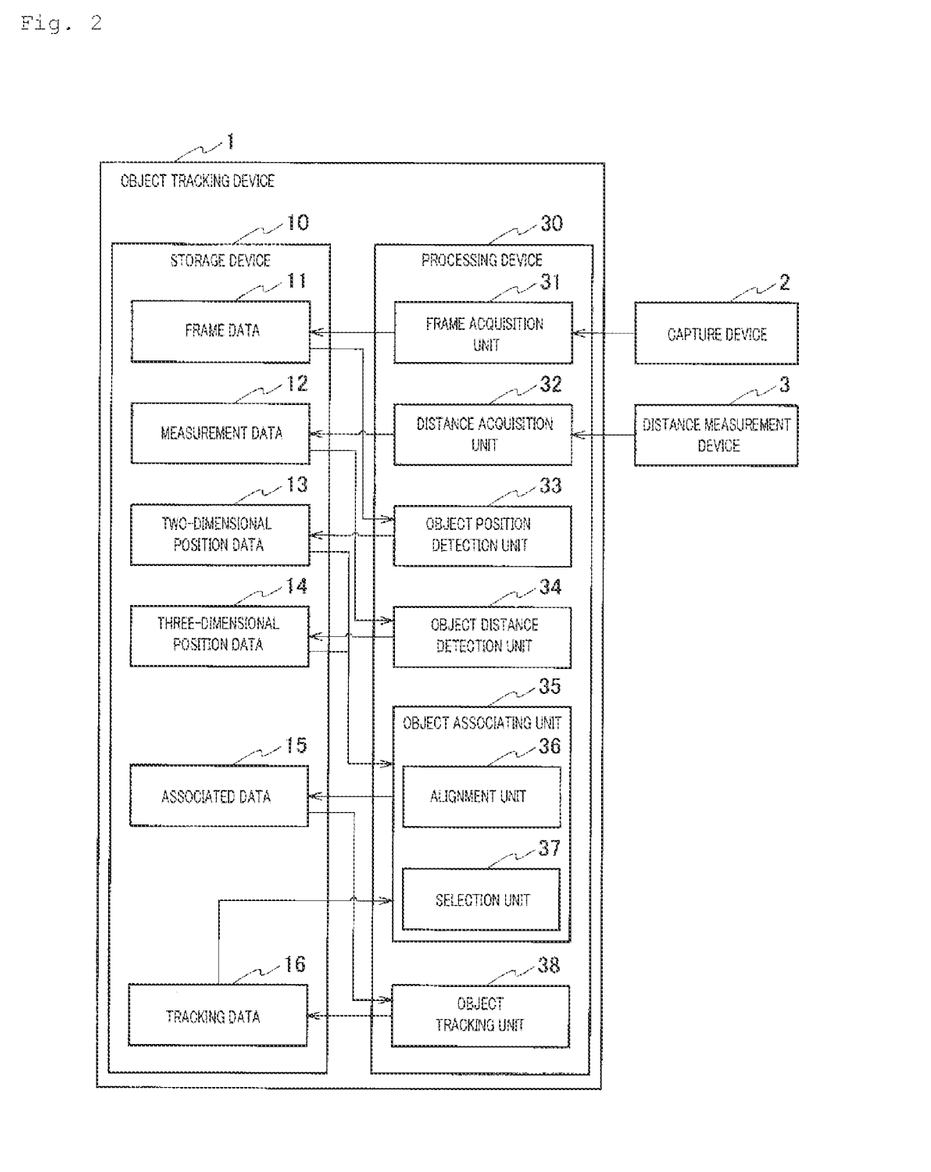
FIG. 2 illustrates a hardware configuration and a function block of the object tracking device according to the embodiment of the present invention.

With reference to FIG. 2, the object tracking device 1 according to the embodiment of the present invention will be described. The object tracking device 1 is a general computer that includes a storage device 10 and a processing device 30. The functions shown in FIG. 2 are achieved by a general computer executing an object tracking program. Although not shown in FIG. 2, the object tracking device 1 may also include an input/output interface or the like for receiving data from the capture device 2 and distance measurement device 3.

The storage device 10 is a read only memory (ROM), a random access memory (RAM), a hard disk, or the like that stores various types of data such as input data, output data, and intermediate data for the processing device 30 to perform processes. The processing device 30 is a central processing unit (CPU) that reads and writes data in the storage device 10 or inputs/outputs data to/from an input/output interface to perform processes in the object tracking device 1.

The storage device 10 stores frame data 11, measurement data 12, two-dimensional position data 13, three-dimensional position data 14, associated data 15, and tracking data 16.

The frame data 11 is one set of frame data that is included in the moving image data captured by the capture device 2

The measurement data 12 is data of a measurement result at the same time as the frame data 11 among measurement results captured by the distance measurement device 3.

Figure 3:
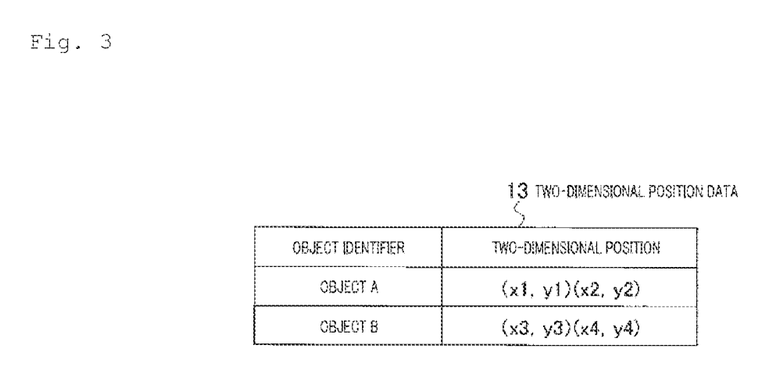
FIG. 3 illustrates a data structure of two-dimensional position data and an example of data according to the embodiment of the present invention.
Figure 7:
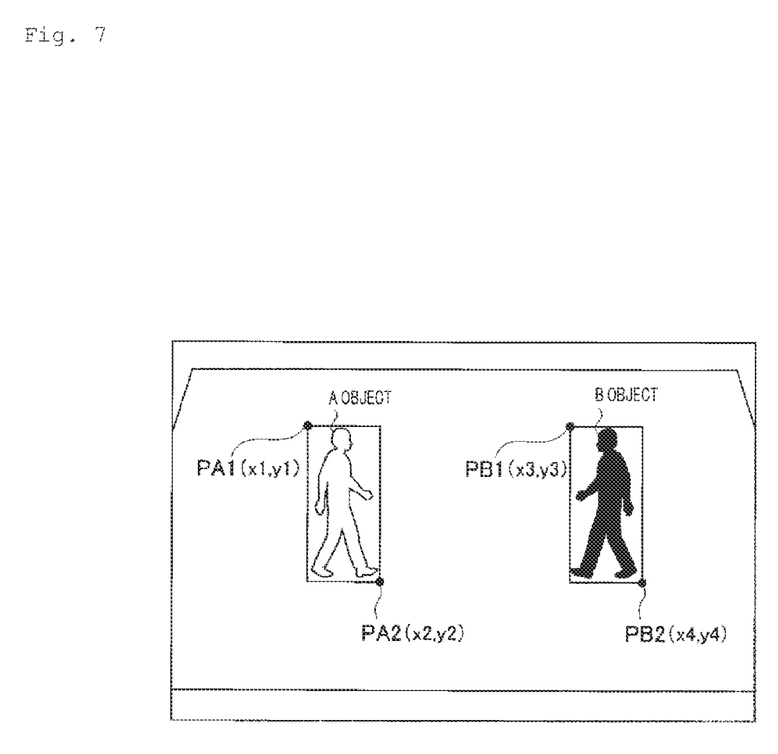
FIG. 7 illustrates positions of objects in frame data according to the embodiment of the present invention.

The two-dimensional position data 13 is data including two-dimensional positions of each object identified. from the frame data 11. The two-dimensional position data 13 is data including an identifier of each object and two-dimensional positions of each obi that are associated with the identifier, as shown in FIG. 3, for example. As shown in FIG. 7, the two-dimensional positions are identified by two-dimensional coordinates of the opposite diagonal corners of a rectangular shape surrounding each object. The identifier of each object in the two-dimensional position data 13 is not an identifier for identifying the object in the frame data 11, but an identifier for indicating a specific object, such as a player name and a player number, which include what the object is.

Figure 4:
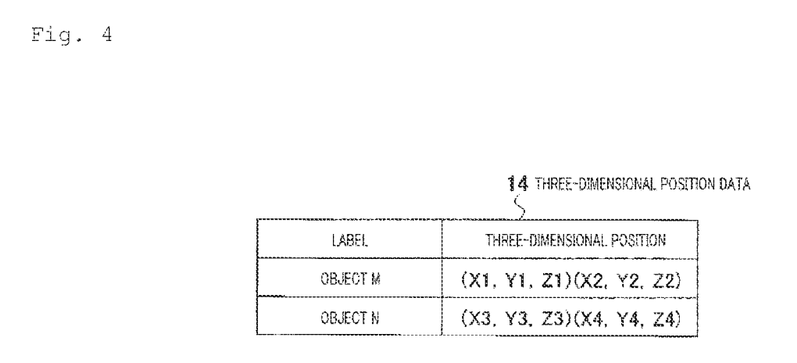
FIG. 4 illustrates a data structure of three-dimensional position data and an example of data according to the embodiment of the present invention.
Figure 8:
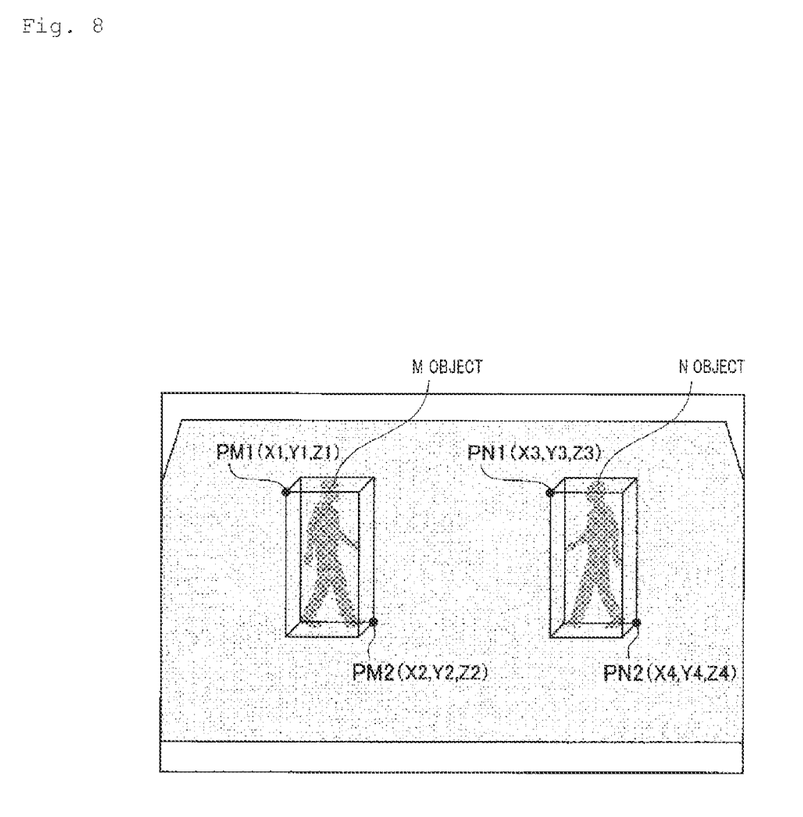
FIG. 8 illustrates positions of objects in measurement data according to the embodiment of the present invention.

The three-dimensional position data 14 is data including three-dimensional positions of each object identified from the measurement data 12. Note that in the three-dimensional position data 14, it is confirmed that two objects are present in the target space, but it is not identified which of the two objects is object A or object B. As shown in FIG. 4, for example, the three-dimensional position data 14 is data including an arbitrarily provided label showing an identifier of each object and three-dimensional positions of the object that are associated with the label. As shown in FIG. 8, the three-dimensional positions are identified by three-dimensional coordinates of the opposite diagonal corners of a box in a rectangular shape surrounding each object identified from the measurement data 12. Note that the points shown in. FIG. 8 are points measured by the distance measurement device 3 and the dark points are portions measured as having an object. Each point in FIG. 8 has three-dimensional coordinates (x, y, a) at a measurement point that are, converted to two-dimensional coordinates and visually shows the three-dimensional position data. 14.

Figure 5:
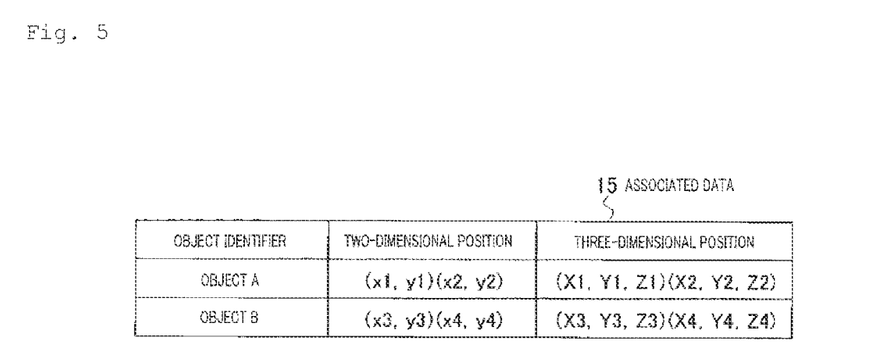
FIG. 5 illustrates a data structure of associated data and an example of data according to the embodiment of the present invention.

The associated data 15 is data associating the two-dimensional positions of each object identified in the two-dimensional position data 13 and the three-dimensional positions of each object identified in the three-dimensional position data 14. As shown in FIG. 5, for example, the associated data 15 is data including an identifier of each object and two- and three-dimensional positions associated with the identifier.

Figure 6:
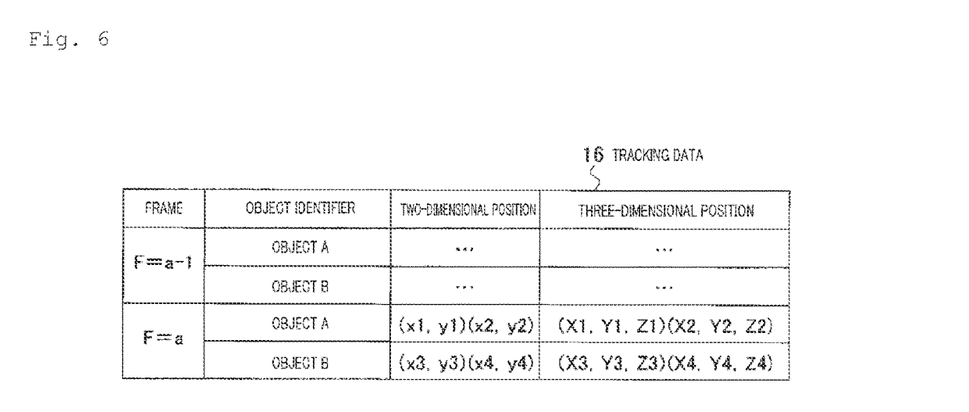
FIG. 6 illustrates a data structure of tracking data and an example of data according to the embodiment of the present invention.

The tracking data 16 is data including the associated data 15 that is associated with the identifiers in the process target frame.

The processing device 30 includes a frame acquisition unit 31, a distance acquisition unit 32, an object position detection unit 33, an object distance detection unit 34, an associating unit, and an object tracking unit 38.

The frame acquisition unit 31 acquires one set of frame data 11 included in moving image data that captures a space where a plurality of objects are present. In the embodiment of the present invention, the frame data 11 includes objects A and B that are captured.

The distance acquisition unit 32 acquires the measurement data 12 from measurement of the three-dimensional coordinates of the points configuring the objects in a space where a plurality of objects are present. In the embodiment of the present invention, the measurement data 12 includes measurement results of the three-dimensional positions of objects A and B.

The object position detection unit 33 detects a two-dimensional position of each of the objects from the frame data 11 on the basis of comparison with template data of each of the objects. The template data in the embodiment of the present invention is data for identifying each object from the frame data 11. The template data is generated on the basis of an image of each object of objects A and B. The object. position detection unit 33 matches the frame data 11 and the template data of each object, identifies the two-dimensional positions of objects A and B in the frame data 11, and outputs the positions to the two-dimensional position data 13. Alternatively, a deep learning network is provided that previously learned template data such as a video of each object, and with the deep learning network, the object position detection unit 33 identifies the two-dimensional positions of objects A and B in the frame data 11 and outputs the positions to the two-dimensional position data 13.

The object position detection unit 33 identifies the positions on the basis of the coordinates of the opposite diagonal corners of a rectangular shape surrounding the detected object. As shown in FIG. 7, for example, the object position detection unit 33 identifies the position of object A in the frame data 11 with PA1 (x1, y1) and PA2 (x2, y2) and identifies the position of object B with PB1 (x3, y3) and PB2 (x4, y4). The object position detection unit 33 associates the identifier of object A with the coordinates of positions PA1 and PA2, associates the identifier of object B with the coordinates of positions PB1 and PB2, and generates the two-dimensional position data 13.

The object distance detection unit 34 detects a plurality of three-dimensional positions of a plurality of objects from the measurement data 12. The object distance detection unit 34 detects the object from the measurement data 12 output from the distance measurement device 3. Note that the object distance detection unit 34 only identifies the position of any object and does not identify which object the object is (whether the object is object A or B).

The object distance detection unit 34 performs clustering, with Euclidean distance, of the point group indicated by the measurement data 12 in the target space. The object distance detection unit 34 determines a bounding box surrounding the positions of each object that results from the clustering. As a result, the object distance detection unit 34 determines the same number of bounding boxes as the number of objects positioned in the target space. In the embodiment of the present invention, the object distance detection unit 34 refers to the object of the left side point group shown in FIG. 8 as object M, the object of the right side point group as object N, and provides each object with an arbitrary label. The object distance detection unit 34 identifies the three-dimensional coordinates defining the bounding box of object N as PM1 (X1, Y1, Z1) and PM2 (X2, Y2, Z2). The object distance detection unit 34 also identifies the three-dimensional coordinates defining the bounding box of object N as PN1 (X3, Y3, Z3) and PN2 (X4, Y4, Z4). The object distance detection unit 34 associates the identifier of object M with the coordinates of positions PM1 and PM2, associates the identifier of object N with the coordinates of positions PN1 and PN2, and generates the three-dimensional position data 14.

After alignment of the two-dimensional position data 13 and three-dimensional position data 14, the associating unit 35 associates the two-dimensional position output from the object position detection unit 33 with the nearest three-dimensional position among a plurality of three-dimensional positions output from the object distance detection unit 34. The associating unit 35 includes an alignment unit 36 and a selection unit 37.

The alignment unit 36 aligns the coordinates of the two-dimensional position data 13 and three-dimensional position data 14 by so-called calibration. The way the alignment unit 36 aligns the coordinates may include previously placing in the target space a checker board or the like in which it is easy to acquire calibration points, capturing the coordinates with the capture device 2 and distance measurement device 3, and using the image. In this method, as a specific process, the alignment unit 36 acquires the coordinate points of the capture device 2 corresponding to the three-dimensional coordinate points (the coordinate points acquired by the distance measurement device 3), and calculates an internal parameter and an external parameter of the capture device 2. This process allows the alignment unit 36 to associate the coordinate points of the capture device 2 and distance measurement device 3 (see, for example, http://opencv.jp/opencv-2.1/cpp/ camera_calibration_and_3d_reconstruction.html). As long as the capture device 2 and distance measurement device 3 remain at the same position, the same value may be used for the parameter. So the alignment unit 36 may apply the same parameter to each frame image. In addition, because the three-dimensional positional relationship between the capture device 2 and the distance measurement device 3 is known, the resulting output coordinates may have the origin at any point in the capture range of the capture device 2, the measurement range of the distance measurement device 3, the target space, or the like.

The selection unit 37 as the two-dimensional position output from the object position detection unit 33 with the nearest three-dimensional position among a plurality of three-dimensional positions output from the object distance detection unit 34, and outputs the associated. data 15. In the embodiment of the present invention, the selection unit 37 compares the positions of objects A and B detected by the object position detection unit 33 and the positions of the two objects detected by the object distance detection unit 34, and associates the coordinates of the nearest positions. The selection unit 37 according to the embodiment of the present invention associates object M shown in FIG. 8 with object A shown in FIG. 7 and object N shown in FIG. 8 with object B shown in FIG. 7. In the associated data 15, the selection unit 37 associates the three-dimensional coordinates of object M with the two-dimensional coordinates of object A and associates the three-dimensional coordinates of object N with the two-dimensional coordinates of object B.

The selection unit 37 selects the object that has the nearest Euclidean distance of the centroid point of a closed region (a rectangular shape or bounding box surrounding the object) determined from two coordinate points, for example. Alternatively, the selection unit 37 selects the object that has the largest overlapping of the closed region. The selection unit 37 acquires the past position information of each object to predict the present position information of each object. The selection unit 37 associates the nearest objects to each other in the prediction.

The associating unit 35 may thus identify the target object's position and associate the target object's three-dimensional position with the target object's position.

If a plurality of three-dimensional positions are present near a predetermined two-dimensional position, the selection unit 37 identifies the three-dimensional position nearest the predetermined two-dimensional position with reference to the process result of a frame other than the process target frame. If the selection unit 37 cannot determine the correspondence between the two- and three-dimensional positions from the frame data 11 and measurement data 12, the selection unit 37 attempts to associate the two- and the three-dimensional positions on the basis of the association obtained from other frame data such as previously processed frame data and the measurement result at the process time point. In so doing, the selection unit 37 estimates the motion of each object on the basis of the process results related to a plurality of previously processed frame data, and attempts to associate the two- and three-dimensional positions in consideration of the estimated motion as well.

The object tracking unit 38 repeats, for other frame data included in the moving image data, the processes of the distance acquisition unit 32, the object position detection unit 33, the object distance detection unit 34, and the associating unit 35. The object tracking unit 38 also repeats, for frame data other than the frame data acquired by the frame acquisition unit 31, the processes of the distance acquisition unit 32, the object position detection unit 33, the object distance detection unit 34, and the associating unit 35.

The object tracking unit 38 may process, in real time, the moving image data being currently captured or moving image data that has been captured. The object tracking unit 38 may associate the object position with each frame data of moving image data captured by the capture device 2 or may thin the frame data by a predetermined rule or frequency to identify the process target frame data and associate the object position with the identified frame data. In particular, when the object tracking unit 38 processes, in real time, the moving image data being currently captured, it may thin and process the frame data according to limitations such as transmission rate in the object tracking device 1, the capture device 2, the distance measurement device 3, and transmission rate between those devices. Also, if the object tracking device 1 takes time in processing, the latest frame data on completion of the process of the object tracking device 1 may be processed.

Object Tracking Method

Figure 9:
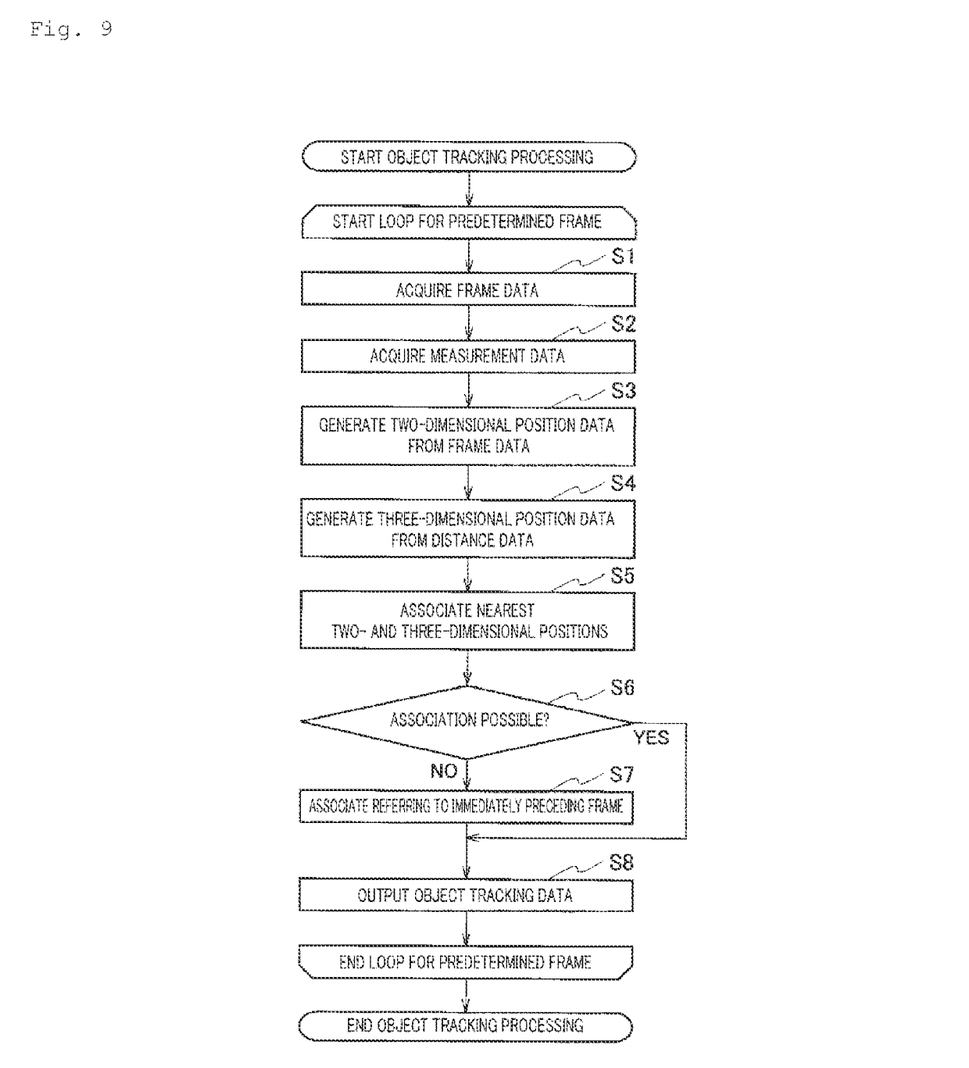
FIG. 9 is a flowchart illustrating an object tracking method according to the embodiment of the present invention.

With reference to FIG. 9, an object tracking method according to an embodiment of the present invention will be described. The object tracking method repeats processes of steps S1 to S8 to predetermined frame data.

In step S1, the object tracking device 1 acquires the frame data 11. In step S2, the object tracking device 1 acquires the measurement data 12 at the same timing as the frame data.

In step S3, the object tracking device 1 compares the frame data 11 acquired at step S1 and template data of each object that has been previously acquired. The object tracking device 1 identifies the position of each object in the frame data 11 and generates the two-dimensional position data 13.

In step S4, the object tracking device 1 identifies the three-dimensional position of each object from the measurement data 12 acquired at step S2 and generates the three-dimensional position data 14.

In step S5, the object tracking device 1 associates each object identified at step S3 with the three-dimensional position identified at step S4 and generates the associated data 15. Here, if it is determined in step S6 that the association was possible, then the operation proceeds to step S8, where the object tracking device 1 associates the two- and three-dimensional positions of each object and outputs the tracking data 16.

If it is determined in step S6 that the association was not possible, then the operation proceeds to step S7, where the object tracking device 1 estimates the motion of each object with also reference to the past frame data such as immediately preceding frame data and associates each object with the three-dimensional position. In step S8, the object tracking device 1 associates the two- and three-dimensional positions of each object and outputs the tracking data 16.

Note that the order of the processes shown in FIG. 9 is an example, and not limited thereto. For example, the processes at steps S1 and S3 and the processes at steps S2 and S4 may be performed at the same time. Specifically, the object tracking device 1 acquires the frame data 11 at step S1 as well as acquires the measurement data 12 at step S2. Then, the object tracking device 1 generates the two-dimensional position data 13 from the frame data 11 at step S3 as well as generates the three-dimensional position data 14 from the distance data 12 at step S4. Here, the processes at steps S3 and S4 may be performed at the same time. Also, the association process at step S6 is applied to the two-dimensional position data 13 generated from the frame data 11 and to the three-dimensional position data 14 that is nearest the time when the frame data 11 is acquired and that is generated from the measurement data 12. Thus, when processing, in real time, the moving image data that is being captured or the like, the object tracking device 1 may perform the process rapidly.

The object tracking device 1 according to the embodiment of the present invention may identify the identifier and two-dimensional position of the object from the frame data 11 acquired from the capture device 2 and identify the three-dimensional position of the object from the measurement data. 12 acquired from the distance measurement device 3. Then, the object tracking device 1 associates the two- and three-dimensional positions of the object and associates the two- and three-dimensional positions of each object. Therefore, even if a plurality of objects are present in the target space, the object tracking device 1 may associate the two- and three-dimensional positions of each object. Also, by repeating this process to plural sets of frame data, the object tracking device 1 may track the position of each object.

Even if it is difficult to associate the inputs from the capture device 2 and distance measurement device 3 the object tracking device 1 according to the embodiment of the present invention may perform the association by estimating the motion of the object from the past position information of the object.

Modification Example

Although the embodiment of the present invention has been described with respect to associating the two- and three-dimensional positions of the entire object, a modification example will be described with respect to associating the positions of a specific site of the object. An object tracking device is according to the modification example estimates the state of the object such as the posture thereof by associating the two- and three-dimensional positions of a plurality of specific sites of the object.

Figure 10:
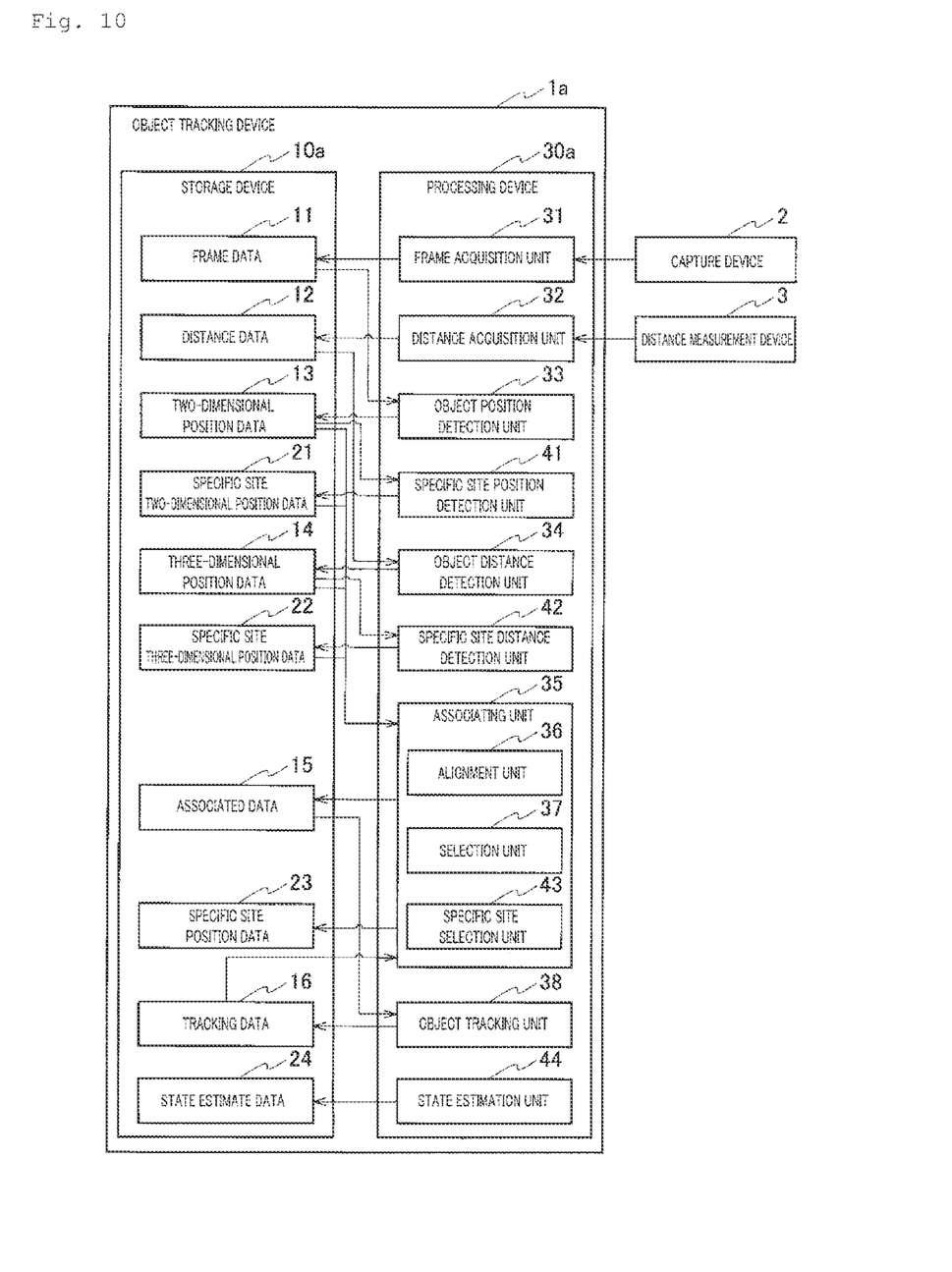
FIG. 10 illustrates a hardware configuration and a function block of an object tracking device according to a modification example of the present invention.

The object tracking device 1a according to the modification example shown in FIG. 10 is different from the object tracking device 1 according to the embodiment of the present invention shown in FIG. 2 in that a storage device 10a includes specific site two-dimensional position data 21, specific site three-dimensional position data 22, specific site position data 23, and state estimate data 24. The difference is also that a processing device 30a includes a specific site position detection unit 41, a specific site distance detection unit 42, a specific site selection unit 43, and a state estimation unit 44.

The specific site two-dimensional position data 21 is two-dimensional position data related to a specific site of the object among the positions of the object identified with the two-dimensional position data 13.

The specific site three-dimensional position data 22 is three-dimensional position data related to the specific site of the object among the positions of the object included in the three-dimensional position data 14. If information is acquired that the object contacts a floor, wall, or the like, the specific site three-dimensional position data 22 further includes information about the contact position of the object.

The specific site position data 23 is data generated by merging the specific site two-dimensional position data 21 and the specific site three-dimensional position data 22. The specific site position data 23 includes information about the position of each specific site of the object. The specific site position data 23 further includes the information about the contact position of the object included in the specific site three-dimensional position data 22.

The state estimate data 24 is data indicating estimated state of the object in the frame data 11 if the object contacts a floor, wall, or the like, the state estimate data 24 may include position information of the floor, wall, or the like.

The specific site position detection unit 41 detects the two-dimensional position of the specific site of the object from the two-dimensional position of the object. The specific site position detection unit 41 detects the specific site of each object from the two-dimensional position data 13 generated by the object position detection unit 33. When the object is a human body, the projection site is a site included in the human body such as a head, hand, foot, arm, or centroid point.

The way the specific site position detection unit 41 detects a site of the object may include detecting the site by image processing using computer vision or detecting the region of the specific site by previously learning a video of sites of the object using deep learning means. In addition, with a public library such as OpenPose, connection information. of the specific site of the object may be used to estimate the position of each part.

The specific site position detection unit 41 detects the position of each specific site for the number of objects included in the frame data 11 (two for objects A and B in the embodiment of the present invention). The specific site position detection unit 41 generates the specific site two-dimensional position data 21 that associates the identifier of the object with the name and position of the detected specific site.

The specific site distance detection unit 42 detects the three-dimensional position of the specific site of the object from the three-dimensional position of the object. The specific site distance detection unit 42 detects the specific site of each object from the three-dimensional position data 14 generated by the object distance detection unit 34. When the object is a human body, the projection site is a site included in the human body such as a head, hand, foot, arm, or centroid point.

The way the specific site distance detection unit 42 detects the site of the object may include, for example, performing shape matching from a point group included in a bounding box surrounding the object, and detecting a portion. resembling the shape of each specific site, such as detecting a sphere-like shape as a head or the like. In addition, the specific site distance detection unit 42 may previously detect a surface such as a floor or wall of a stage in the target space, and if a distance between the surface and a point in a point group included in a bounding box surrounding the object is equal to or less than a threshold, may determine the location such as a foot, for example, as the specific site at which the object contacts the surface.

Note that one way for the specific site distance detection unit 42 to determine a surface from point group data may include, for example, determining a normal vector with a set of points randomly selected from the point group data and calculating normal vectors in the same direction to determine the surface (Plane model segmentation (http://pointclouds.org/docamentation/tutorials/planar_segment ation.php#planar-segmentation) with reference to). The surface may be determined to be a floor of a stage if the surface is horizontal. The surface may also be determined to be a wall of a stage the surface is vertical.

The specific site distance detection unit 42 includes the three-dimensional position of each specific site and information about the coordinate position of the object contact to generate the specific site three-dimensional position data 22.

The specific site selection unit 43 merges the position information of the specific site included in the specific site two-dimensional position data 21 and specific site three-dimensional position data 22 to generate the specific site position data 23. Here, if position information of both two- and three-dimensional positions are available for the specific site, the specific site selection unit 43 may use only one position information or use new position information generated from both the information. The specific site selection unit 43 includes the information about the coordinate position of the object contact included in the specific site three-dimensional position data 22 to generate the specific site position data 23.

The state estimation unit 44 estimates the state of the object from the two- and three-dimensional positions of the specific site with reference to the specific site position data 23. The state estimation unit 44 estimates the state of the object such as the posture thereof from the position information of each specific site of the object. The state estimation unit 44 may estimate the state of the object such as the posture thereof by adding information about the object contacting a floor or wall, which is indicated by the specific site position data 23.

The state estimation unit 44 generates the state estimate data 24 including the estimated state of the object in the frame data 11. If the object contacts a floor, a wall, or the like, the state estimation unit 44 may include the position information of the floor, wall, or the like in the state estimate data 24. The state estimation unit 44 may store the state estimated about each frame data 11 the state estimate data 24 in time-series.

One way of detecting the posture of the object of a person is, for example, modeling a skeleton shape of a human. body in a tree structure and detecting the posture from each connection characteristics (Haruka YONEMOTO, Kazuhiko MURASAKI, Tatsuya OSAWA, Kyoko SUDO, Jun SHIMAMURA, Yukinobu TANIGUCHI, "Articulated pose estimation from ego-centric vision for action recognition", IEICE technical report (2015-3), PRMU2014-176). In so doing, if it is obvious that a person cannot take the posture, the information or the specific site of the human body may be corrected and the posture may be detected again. The estimation of the posture of the object may include, for example, previously preparing information about a variety of postures as learning data and selecting a suitable posture therefrom and outputting it.

The object tracking device 1*a* according to the modification example may estimate the state of the object such as the posture thereof by associating the two and three-dimensional positions for a plurality of specific sites of the object.

For example, the object tracking device 1*a* may automatically recognize, in real time, the posture of objects A and B that are doing Judo. Also the position and posture information of the object may be used to add effect on video according to the position and posture of the object, for example. Also the object is a person doing Judo, the object tracking device 1*a* may identify the name of the Judo technique according to the state of each person and display the identified name of the technique and the relevant information or the like.

Other Embodiments

Thus, although the invention has been described with respect to a particular embodiment and a modification example thereof, the description and drawings, which form a part of this disclosure, are not to be understood as limiting this invention. From this disclosure, various alternative embodiments, examples, and operation technology will be apparent to those skilled in the art.

For example, the object tracking device described in the embodiment of the present invention may be configured on one piece of hardware as shown in FIG. 2 or configured on plural pieces of hardware depending on its function and process number. The object tracking device may also be provided on an existing moving image processing system.

It will be appreciated that the present invention comprises various embodiments or the like not described herein. Therefore, the scope of the present invention should be determined only by the matter specifying the invention according to the claims valid from the above description.

REFERENCE SIGNS LIST

1 Object tracking device
2 Capture device
3 Distance measurement device
5 Object tracking system
10 Storage device
11 Frame data
12 Measurement data
13 Two-dimensional position data
14 Three-dimensional position data
15 Associated data
16 Tracking data
21 Specific site two-dimensional position data
22 Specific site three-dimensional position data
23 Specific site position data
24 State estimate data
31 Frame acquisition unit
32 Distance acquisition unit
33 Object position detection unit
34 Object distance detection unit
35 Associating unit
36 Alignment unit
37 Selection unit
38 Object tracking unit
41 Specific site position detection unit
42 Specific site distance detection unit
43 Specific site selection unit
44 State estimation unit

The invention claimed is:

1. An object tracking device for tracking, from moving image data that captures a space where a plurality of objects are present, positions of the objects, the object tracking device comprising: a frame acquisition unit, including one or more processors, for acquiring one set of frame data included in the moving image data that captures the space where the objects are present; a distance acquisition unit, including one or more processors, for acquiring measurement data from measurement of three-dimensional coordinates of points configuring the objects in the space where the objects are present; an object position detection unit, including one or more processors, for detecting a two-dimensional position of each of the objects from the frame data on the basis of comparison with template data of each of the objects; an object distance detection unit, including one or more processors, for detecting a plurality of three-dimensional positions of the objects from the measurement data; and an associating unit, including one or more processors, for associating each two-dimensional position output from the object position detection unit with the nearest three-dimensional position among the three-dimensional positions output from the object distance detection unit, processes of the distance acquisition unit, the object position detection unit, the object distance detection unit, and the associating unit being repeated for other sets of frame data included in the moving image data.

2. The object tracking device according to claim 1, further comprising: a specific site position detection unit, including one or more processors, for detecting a two-dimensional position of a specific site of the object from the two-dimensional position of the object; a specific site distance detection unit, including one or more processors, for detecting a three-dimensional position of the specific site of the object from the three-dimensional position of the object; and a state estimation unit, including one or more processors, for estimating a state of the object from the two- and three-dimensional positions of the specific site.

3. The object tracking device according to claim 1, wherein if a plurality of three-dimensional positions are present near a predetermined two-dimensional position, the associating unit identifies a three-dimensional position nearest the predetermined two-dimensional position with reference to a process result of a frame other than the process target frame.

4. An object tracking method of tracking, from moving image data that captures a space where a plurality of objects are present, positions of the objects, the object tracking method comprising the steps of: acquiring, by a computer, one set of frame data included in the moving image data that captures the space where the objects are present; acquiring, by the computer, measurement data from measurement of three-dimensional coordinates of points configuring the objects in the space where the objects are present; detecting, by the computer, a two-dimensional position of each of the objects from the frame data on the basis of comparison with template data of each of the objects; detecting, by the computer, a plurality of three-dimensional positions of the objects from the measurement data; and associating, by the computer, each two-dimensional position output from the step of detecting a two-dimensional position with the nearest three-dimensional position among the three-dimensional positions output from the step of detecting a plurality of three-dimensional positions, the computer repeating each step.

5. The object tracking method according to claim 4, further comprising the steps of: detecting, by the computer, a two-dimensional position of a specific site of each object from the two-dimensional position of each object; detecting, by the computer, a three-dimensional position of the specific site of each object from the three-dimensional position of each object; and estimating, by the computer, a state of each object from the two- and three-dimensional positions of the specific site.

6. The object tracking method according to claim 4, wherein if a plurality of three-dimensional positions are present near a predetermined two-dimensional position, the associating step comprises identifying a three-dimensional position nearest the predetermined two-dimensional position with reference to a process result of a frame other than the process target frame.

7. An object tracking program for causing a computer to function as the object tracking device according to claim 1.

* * * * *